United States Patent
Wang

(10) Patent No.: US 10,642,545 B2
(45) Date of Patent: May 5, 2020

(54) INFORMATION PROCESSING APPARATUS THAT CONTROLS SHIFTING BETWEEN POWER STATES IN ACCORDANCE WITH REMAINING STORAGE CAPACITY AND CONTROL METHOD THEREOF

(71) Applicant: CANON KABUSHIKI KAISHA, Tokyo (JP)

(72) Inventor: Xiaoli Wang, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/261,958

(22) Filed: Jan. 30, 2019

(65) Prior Publication Data

US 2019/0163419 A1 May 30, 2019

Related U.S. Application Data

(63) Continuation of application No. PCT/JP2017/020238, filed on May 31, 2017.

(30) Foreign Application Priority Data

Aug. 5, 2016 (JP) ................................. 2016-154948

(51) Int. Cl.
   *G06F 3/12* (2006.01)
   *H04N 1/21* (2006.01)
   (Continued)

(52) U.S. Cl.
   CPC ............ *G06F 3/1221* (2013.01); *B41J 29/38* (2013.01); *G06F 1/3268* (2013.01);
   (Continued)

(58) Field of Classification Search
   CPC ..................................................... G06F 3/1221
   See application file for complete search history.

(56) References Cited

U.S. PATENT DOCUMENTS

2012/0110286 A1* 5/2012 Yaoyama .............. G06F 1/3234
   711/161
2014/0189204 A1* 7/2014 Sugimoto ............... G06F 3/061
   711/103

(Continued)

FOREIGN PATENT DOCUMENTS

JP 2006338691 A 12/2006
JP 2012164136 A * 8/2012

(Continued)

OTHER PUBLICATIONS

International Search Report issued in parent International Application No. PCT/JP2017/020238 dated Aug. 29, 2017.

*Primary Examiner* — Jacky X Zheng
(74) *Attorney, Agent, or Firm* — Venable LLP

(57) ABSTRACT

An information processing apparatus includes a first storage unit that has a power restricted state and an activated state, and a second storage that has a higher access speed than the first storage. A determination unit determines whether or not the first storage unit needs to be used based on a remaining storage capacity in which data can be stored in the second storage unit. A control unit causes, in a state where data can be stored in the second storage unit, the first storage unit to be in the power restricted state, and makes the first storage unit switch from the power restricted state to the activated state in a case where it is determined, while the first storage unit is in the power restricted state, that the first storage unit needs to be used.

13 Claims, 7 Drawing Sheets

(51) Int. Cl.
*H04N 1/00* (2006.01)
*G06F 1/3287* (2019.01)
*G06F 1/3234* (2019.01)
*G06F 13/10* (2006.01)
*G06F 3/06* (2006.01)
*B41J 29/38* (2006.01)

(52) U.S. Cl.
CPC .......... *G06F 1/3284* (2013.01); *G06F 1/3287* (2013.01); *G06F 3/06* (2013.01); *G06F 3/1231* (2013.01); *G06F 3/1257* (2013.01); *G06F 13/10* (2013.01); *H04N 1/00* (2013.01); *H04N 1/0027* (2013.01); *H04N 1/00896* (2013.01); *H04N 1/21* (2013.01); *Y02D 10/14* (2018.01)

(56) References Cited

U.S. PATENT DOCUMENTS

2015/0341516 A1* 11/2015 Hikichi .............. H04N 1/00474
358/1.14
2018/0129508 A1   5/2018 Wang

FOREIGN PATENT DOCUMENTS

| JP | 2012164136 A | 8/2012 |
| JP | 2012243117 A | 12/2012 |
| JP | 2014138342 A | 7/2014 |

* cited by examiner

FIG. 8

| DATA | TYPE | SCORE | SIZE [MB] | SCORE | ELAPSED TIME FROM MOST RECENT ACCESS | SCORE | ACCESS FREQUENCY | SCORE | TOTAL SCORE |
|---|---|---|---|---|---|---|---|---|---|
| DATA A | SETTING | 100 | 1 | 99 | 5 | 95 | 20 | 100 | 394 |
| DATA B | COPYING | 0 | 100 | 0 | 50 | 50 | 0 | 0 | 50 |
| DATA C | SCAN SAVE | 50 | 300 | 0 | 15 | 85 | 3 | 15 | 150 |

INFORMATION PROCESSING APPARATUS THAT CONTROLS SHIFTING BETWEEN POWER STATES IN ACCORDANCE WITH REMAINING STORAGE CAPACITY AND CONTROL METHOD THEREOF

CROSS-REFERENCE TO RELATED APPLICATIONS

This application is a Continuation of International Patent Application No. PCT/JP2017/020238, filed May 31, 2017, which claims the benefit of Japanese Patent Application No. 2016-154948, filed Aug. 5, 2016, both of which are hereby incorporated by reference herein in their entirety.

BACKGROUND OF THE INVENTION

Field of the Invention

The present invention relates to an information processing apparatus, and a control method thereof.

Background Art

An image forming apparatus such as a printer or an MFP includes a secondary storage device for storing data such as image data, setting data, and the like. An HDD (hard disk drive) is representative of such a secondary storage device. Currently, in order to increase the performance of an image forming apparatus, the incorporation of an SSD (solid-state drive), which has a high access speed, as a secondary storage device in an image forming apparatus is being considered. In general, an SSD has a smaller storage capacity than an HDD, and is more expensive than an HDD. Hence, in order to increase the performance of the image forming apparatus while supplementing the deficiencies of the SSD, combined use of the SSD and the HDD in the image forming apparatus is being considered.

PTL1 proposes a technique of using an SSD and an HDD in combination. In PTL1, between a low-speed storage medium (HDD) with a low access speed and a high-speed storage medium (SSD) with a high access speed, data is moved between the low-speed storage medium and the high-speed storage medium based on data access frequency. More specifically, the overall performance of a system is improved by storing, among the sets of data handled by a system, data with high access frequency in the high-speed storage medium and storing the remaining sets of data in the low-speed storage medium.

CITATION LIST

Patent Literature

PTL 1: Japanese Patent Laid-Open No. 2012-243117

As described above, a technique in which the SSD and the HDD are used in combination based on the data access frequency may shorten the lifespan of the HDD (shorten the period until the HDD breaks down) if the HDD spins up and spins down (activates and stops) frequently. In addition, extra power will be consumed by the HDD if the HDD is continuously maintained in an activated state after the execution of a spin-up operation to avoid frequent execution of the spin-up operation and the spin-down operation of the HDD.

The present invention has been made in consideration of the above problem. The present invention provides a technique of, in an information processing apparatus that uses an HDD and an SSD in combination, reducing the power consumption of the HDD while avoiding the execution of the spin-up operation and the spin-down operation of the HDD as much as possible.

SUMMARY OF THE INVENTION

An information processing apparatus according to one aspect of the present invention comprises: a first storage unit that has a power restricted state in which supply of power is restricted and an activated state in which power is supplied; a second storage unit that has a higher access speed than the first storage unit; a determination unit configured to determine whether or not the first storage unit needs to be used based on a remaining storage capacity in which data can be stored in the second storage unit; and a control unit configured to cause, in a state in which data can be stored in the second storage unit, the first storage unit to be in the power restricted state, and to make the first storage unit switch from the power restricted state to the activated state in a case where the determination unit determines, while the first storage unit is in the power restricted state, that the first storage unit needs to be used.

In addition, an information processing apparatus according to another aspect of the present invention comprises: a first storage unit that has a power restricted state in which supply of power is restricted and an activated state in which the power is supplied; a second storage unit that has a higher access speed than the first storage unit; and a control unit configured to cause, in a state in which data can be stored in the second storage unit, the first storage unit to be in the power restricted state, and to make the first storage unit switch from the power restricted state to the activated state in accordance with a remaining storage capacity of the first storage unit becoming less than a predetermined capacity while the first storage unit is in the power restricted state, wherein the control unit controls write processing so as to write data in the second storage unit when the first storage unit is in the power restricted state, and to write data in the first storage unit after the first storage unit is switched to the activated state.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 8 is a table showing an example of priority setting of save-candidate data.

DESCRIPTION OF EMBODIMENTS

Hereinafter, the embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment describes, as an example of an information processing apparatus, a multi-function peripheral (MFP), that is an image forming apparatus (image processing apparatus) which has a plurality of functions such as a print function, a copy function, an image transmission function, an image saving function, and the like. Note that this embodiment is not only applicable to an MFP but also similarly applicable to an information processing apparatus such as a printing apparatus (printer), a copy machine, a facsimile apparatus, a PC, or the like.

<MFP>

Figure 1:
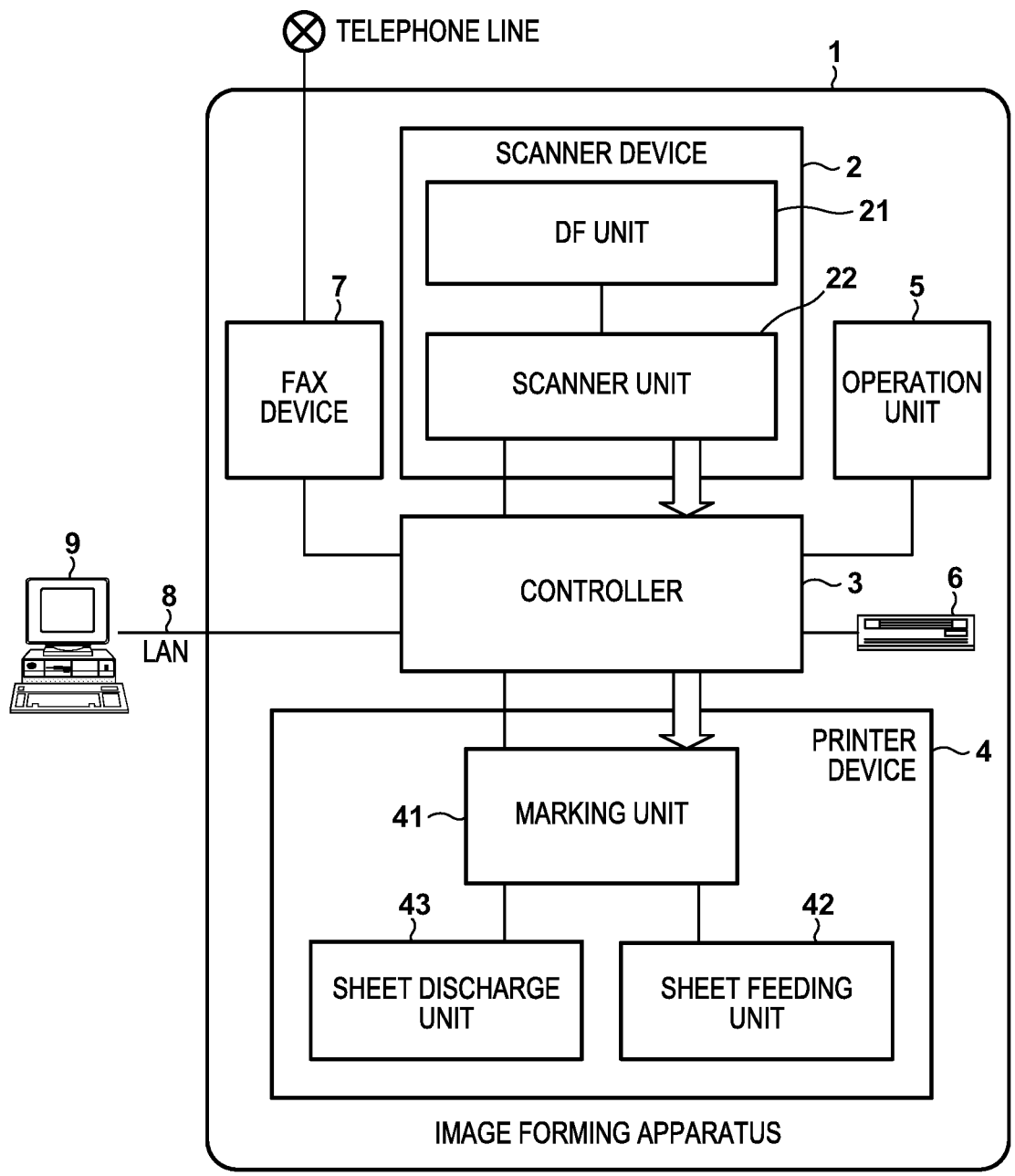
FIG. 1 is a block diagram showing an example of the arrangement of an image forming apparatus.

FIG. 1 is a block diagram showing an example of the arrangement of an MFP 1 according to this embodiment. The MFP 1 includes a scanner device 2, a controller 3, a printer device 4, an operation unit 5, an HDD (hard disk drive) 6, and a FAX (facsimile) device 7. The scanner device 2 optically reads an image of a document, converts the read image into a digital image, and outputs the digital image as image data. The printer device 4 prints (outputs) an image on a sheet based on the image data. Note that a sheet may be referred to as a recording sheet, a recording material, a recording medium, a sheet, a transfer material, a transfer sheet, or the like. An operation unit 5 accepts the operation made by the user on the MFP 1. The HDD 6 according to this embodiment is a comparatively large-capacity and nonvolatile storage device. The HDD 6 stores image data and control programs and application programs executed by a main CPU 201. The HDD 6 according to this embodiment is an example of a first storage means that has a power restricted state in which supply of power is restricted and an activated state in which power is supplied. The FAX device 7 transmits image data to a designated address by FAX transmission via a telephone line.

The controller 3 implements the execution of various kinds of jobs of the MFP 1 by controlling the operations of the respective devices connected to the controller 3. In addition, the controller 3 transmits (outputs), via a LAN 8, image data to an external host computer (PC) 9 and accepts input of image data by receiving the image data from the PC 9. Furthermore, the controller 3 may receive, from the PC 9, an instruction or an input of a job via the LAN 8.

The scanner device 2 includes a document feeding (DF) unit 21 and a scanner unit 22. The DF unit 21 feeds, from a document bundle, a document sheet to the scanner unit 22 sheet by sheet. The scanner unit 22 optically reads an image of each fed document sheet, converts the read image into a digital image, and transmits (outputs) the converted digital image as image data to the controller 3. The printer device 4 includes a marking unit 41, a sheet feeding unit 42, and a sheet discharge unit 43. The sheet feeding unit 42 feeds a sheet to the marking unit 41 sheet by sheet. The marking unit 41 prints an image on the fed sheet and discharges the printed sheet to the sheet discharge unit 43. The operation unit 5 includes operation buttons and a display panel which has a touch panel function, is used by the user to instruct an operation such as copying to the MFP 1, and is used to present various kinds of information related to the MFP 1 to the user.

The MFP 1 has a plurality of functions such as a print function, a copy function, an image transmission function, an image saving function, and the like.

The print function is a function of analyzing print data which is described in, for example, the page description language (PDL) and has been received from an external apparatus such as the PC 9 or the like, converting the analyzed print data into image data to be used for printing, and printing an image on a sheet by the printer device 4 based on the image data.

The copy function is a function of storing, in the HDD 6, image data obtained by reading an image of a document by the scanner device 2 and printing the image on a sheet by the printer device 4 based on the image data.

The image transmission function is a function of transmitting image data, obtained by reading an image of a document by the scanner device 2, to an external apparatus via the FAX device 7 or the LAN 8.

The image saving function is a function of saving image data by storing in the HDD 6 the image data output from the scanner device 2. The image data stored in the HDD 6 can be transmitted or be used for printing as needed.

The MFP 1 can execute various kinds of jobs such as a copy job, a transmission job, a print job, and the like by using the above-described functions. Note that the MFP 1 according to this embodiment can use not only the HDD 6 but also an SSD 207 (FIG. 2) as the image data storage destination of each function.

<Controller>

Figure 2:
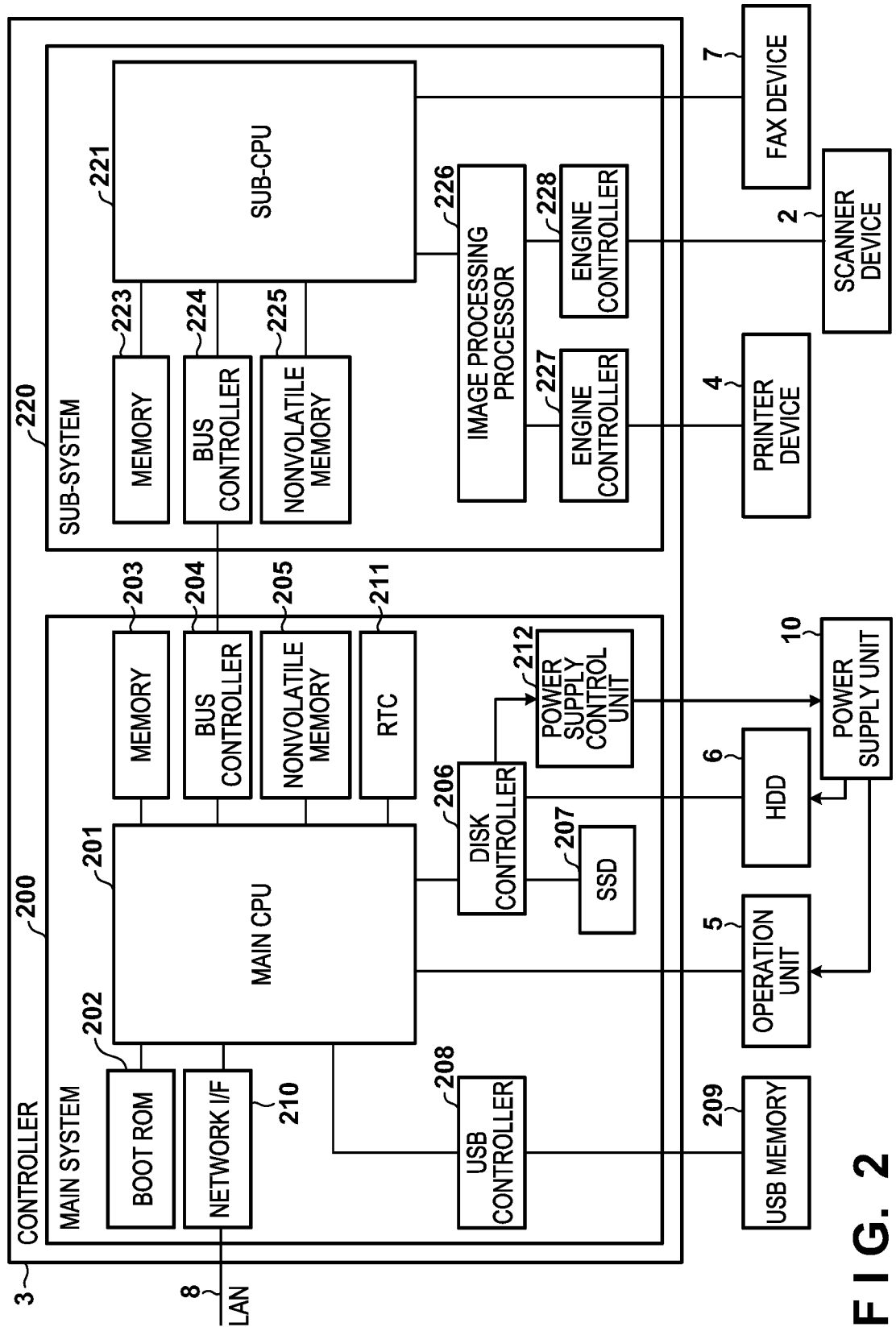
FIG. 2 is a block diagram showing an example of the arrangement of a controller.

FIG. 2 is a block diagram showing an example of the arrangement of the controller 3. The controller 3 is formed by a main system (main board) 200 and a sub-system (sub-board) 220. The main system 200 is a CPU system for controlling the overall MFP 1. The sub-system 220 is connected to the main system 200 and is a CPU system formed by hardware for image processing. A USB memory 209, the operation unit 5, the HDD 6, and the like are connected to the main system 200. The scanner device 2, the printer device 4, the FAX device 7, and the like are connected to the sub-system 220.

The main system 200 includes the main CPU 201, a boot ROM 202, a memory 203, a bus controller 204, a nonvolatile memory 205, a disk controller 206, and the SSD (solid-state drive) 207. The main system 200 further includes a USB controller 208, a network I/F (interface) 210, an RTC 211, and a power supply control unit 212.

The main CPU 201 controls the overall main system 200 as well as the overall MFP 1. The boot ROM 202 stores a boot program which is executed by the main CPU 201 when the MFP 1 is activated. The memory 203 is used as a work memory of the main CPU 201. The bus controller 204 has a function of bridging an external bus (a bus on the side of the sub-system 220 in this embodiment). The nonvolatile memory 205 stores setting data and the like used which are used by the main CPU 201. The RTC 211 has a clock function.

The disk controller 206 controls the HDD 6 and the SSD 207 which correspond to secondary storage devices included in the MFP 1. The SSD 207 is a nonvolatile storage device formed by a semiconductor device, and is capable of performing random access at a higher speed than the HDD 6 although its data storage capacity is smaller than that of the HDD 6. That is, the SSD 207 has a higher write speed and a higher read speed (access speed) than the HDD 6. In this manner, the SSD 207 is an example of a secondary storage unit that has a higher access speed than the HDD 6.

The power supply control unit 212 controls the power supply unit 10 of the MFP 1. The power supply unit 10 is a power supply for supplying power to each device in the MFP 1. The disk controller 206 can control, as will be described later, supply of power from the power supply unit 10 of the MFP 1 to the HDD 6 by controlling the power supply control unit 212 based on the storage capacity (free space) remaining in the SSD 207. This allows the disk controller 206 to control the state of the HDD 6. The USB controller 208 controls a USB device such as the USB memory 209 or the like. The USB device may be removable from the MFP 1.

The sub-system 220 includes a sub-CPU 221, a memory 223, a bus controller 224, a nonvolatile memory 225, an image processing processor 226, and engine controllers 227 and 228. The sub-CPU 221 controls the overall sub-system 220 under the control of the main CPU 201. The memory 223 is used as a work memory of the sub-CPU 221. The bus controller 224 has a function of bridging an external bus (a bus on the side of the main system 200 in this embodiment). The nonvolatile memory 225 stores setting data and the like to be used by the sub-CPU 221.

The image processing processor 226 performs image processing on image data output to the printer device 4 and image data input from the scanner device 2. The engine controller 227 exchanges image data between the image processing processor 226 and the printer device 4, and controls the printer device 4 in accordance with the instructions from the sub-CPU 221. The engine controller 228 exchanges image data between the image processing processor 226 and the scanner device 2 and controls the scanner device 2 in accordance with the instructions from the sub-CPU 221. The FAX device 7 is directly controlled by the sub-CPU 221. Note that although it is not shown in FIG. 2 for the sake of descriptive convenience, the main CPU 201 and the sub-CPU 221 include a plurality of CPU peripheral hardware such as a chipset, a bus bridge, a clock generator, and the like.

An operation for implementing the copy function will be described next as an example of the operation of the controller 3. When a user of the MFP 1 instructs image copying by operating the operation unit 5, the main CPU 201 transmits a read instruction to the scanner device 2 via the sub-CPU 221. The scanner device 2 generates image data by reading an image of a document in accordance with the received instruction, and inputs the generated image data in the image processing processor 226 via the engine controller 228. The image processing processor 226 temporarily stores the image data in the memory 223 by executing DMA transfer of the input image data to the memory 223 via the sub-CPU 221. Upon confirming, by receiving a notification from the sub-CPU 221, that a predetermined amount of image data, or image data corresponding to the entire copy-target documents has been stored in the memory 223, the main CPU 201 transmits a print instruction to the printer device 4 via the sub-CPU 221.

The sub-CPU 221 notifies the image processing processor 226 of the storage location of the image data in the storage area of the memory 223. As a result, the image data on the memory 223 is transferred to the printer device 4 via the image processing processor 226 and the engine controller 227 in accordance with a synchronization signal output from the printer device 4. The printer device 4 prints, in accordance with the received instruction, an image onto a sheet based on the image data transferred from the memory 223. Note that the image data temporarily stored in the memory 223 may be stored in the HDD 6. As a result, reprinting by the printer device 4 may be implemented by using the image data stored in the HDD 6.

<Disk Controller>

Figure 3A:
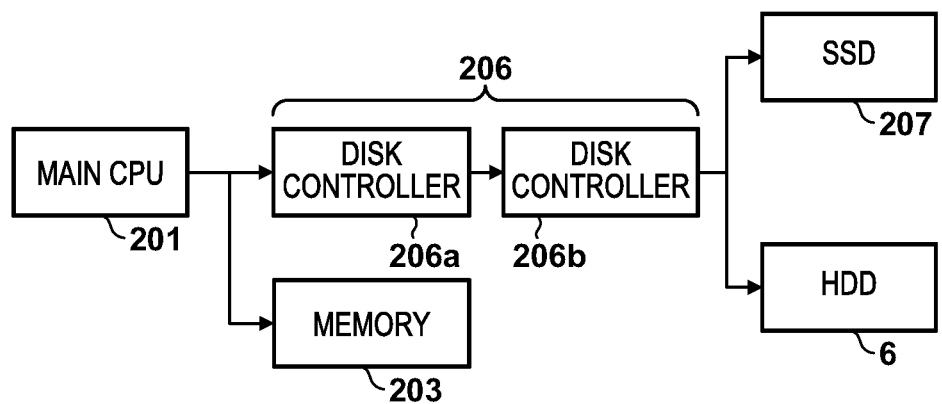
FIG. 3A is a block diagram showing an arrangement for access control to an HDD and an SSD.

FIG. 3A is a block diagram showing an arrangement for access control to the HDD 6 and the SSD 207 which is executed by the disk controller 206 in the MFP 1, and shows the functional blocks related to the access control. An outline of the operation of the disk controller 206 that performs access control to the HDD 6 and the SSD 207 will be described here with reference to FIG. 3A.

In MFPP1, when various kinds of jobs such as those described above are to be executed, a write access or a read access to the storage devices (the HDD 6 and the SSD 207) occurs. If a write access to a storage device (that is, a request to write data to a storage device) occurs, the main CPU 201 transmits a write command to the disk controller 206. If a read access to a storage device (that is, a request to read out data from a storage device) occurs, the main CPU 201 transmits a read command to the disk controller 206. The disk controller 206 controls data reading or data writing for the respective storage devices (the HDD 6 and the SSD 207) in accordance with the command received from the main CPU 201.

In a case in which the disk controller 206 receives a read command related to data stored in the HDD 6, the disk controller reads out the data stored in the HDD 6 and transmits the data to the main CPU 201. Also, in a case in which the disk controller 206 receives a read command related to data stored in the SSD 207, the disk controller reads out the data stored in the SSD 207 and transmits the data to the main CPU 201. In a case in which the disk controller 206 receives a write command and write-target data from the main CPU 201, the disk controller stores the received data in one of the HDD 6 and the SSD 207. In this case, the disk controller 206 will store the data in one of the HDD 6 and the SSD 207 based on write control which will be described later.

As shown in FIG. 3A, the disk controller 206 may be divided into a disk controller 206a and a disk controller 206b. Note that the functions of the disk controller 206a and the disk controller 206b can be implemented by the one disk controller 206.

If a write access to a storage device occurs, the disk controller 206a selects (determines) a storage destination of the write-access target data from the HDD 6 and the SSD 207 based on a predetermined condition. For example, the disk controller 206a selects the SSD 207 as the storage destination of the target data if there is sufficient data storage capacity remaining in the SSD 207. Alternatively, the disk controller 206a can determine the type (for example, image data or setting data) and the size of the write-access target data and select the storage destination of the target data based on the determination result.

The disk controller 206b stores the target data in the storage destination selected by the disk controller 206a in accordance with an instruction from the disk controller 206a. The disk controller 206b also performs, as needed, encrypting processing of the write-target data to the HDD 6 or the SSD 207 and decrypting processing of the data which is read out from the HDD 6 or the SSD 207. The disk controller 206b also has a function of copying (mirroring) data between the SSD 207 and the HDD 6.

If a read access to a storage device occurs, the disk controller 206a transmits an instruction to the disk controller 206b about the data to be the readout target of the read command. The disk controller 206b reads out, from the HDD 6 or the SSD 207, the data that has been instructed by the disk controller 206a, and transmits the data to the main CPU 201.

The disk controllers 206a and 206b can grasp the state of the HDD 6 (whether the HDD is in a sleep state or in an activated state), and can switch the state of the HDD 6 between the sleep state and the activated state as needed. For example, if an access (a read access or a write access) to the HDD 6 occurs while the HDD 6 is in the sleep state, the disk controller 206b makes the HDD 6 switch from the sleep state to the activated state. In this case, the disk controller 206b will make the HDD 6 return from the activated state to the sleeps state after the activated state has been maintained for a predetermined time since the switch to the activated state (that is, after the elapse of a predetermined time). This is done to avoid, as will be described later, frequent execution of the spin-up operation and the spin-down operation of the HDD 6. Note that it may be arranged so that the disk controllers 206a and 206b will determine whether or not the HDD 6 is energized (whether or not power is supplied to the HDD 6) based on the information from the main CPU 201.

<Operation and Power Consumption of HDD>

Figure 4:
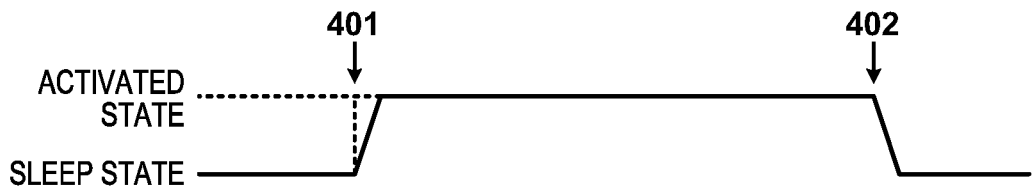
FIG. 4 is a view showing an example of operations of the HDD.

FIG. 4 is a view showing an example of the operation of a general HDD. As shown in FIG. 4, the HDD has a sleep state (power restricted state) and an activated state. In contrast to power being supplied to the HDD in the activated state, supply of power to the HDD is restricted in the sleep state, and the power consumption of the HDD is suppressed to be lower than that in the activated state. Hence, the power consumption of the apparatus (the MFP 1 in this embodiment) incorporating the HDD can be reduced by maintaining the HDD in the sleep state as much as possible.

Here, the following modes ("PHY Ready (PHYRDY)", "Partial" and "Slumber") are examples of so-called power restricted states of an HDD and an SSD conforming to SATA. As the HDD and the SSD on the side of an SATA device, it is not necessary to energize a circuit other than the HDD circuit and the SSD circuit conforming to the SATA to be described below.

(1) PHY Ready (PHYRDY): A PHY (physical layer) defined in compliance with the SATA standard is in a data transmission/reception enabled state.

(2) Partial: The PHY is in a power saving state (reduced power mode). The return time is allowed as long as it is within 10 μs.

(3) Slumber: The PHY is in a power saving state in which the power consumption is lower than in the Partial mode. The maximum return time is 10 ms. A wake-up signal sequence is transmitted from a host or a device, and upon receiving the wakeup signal, the PHY enters the activated state or the PHYRDY mode.

Note that the above-described return time is the maximum time until a product in compliance with the SATA standard returns to the PHYRDY mode upon receiving the wake-up signal.

As shown in FIG. 4, if an access (a read access or a write access) to an HDD in a sleep state occurs (401), the HDD is switched from the sleep state to the activated state. More specifically, when the restriction of the supply of power is canceled, the HDD spins up (starts rotating the disk) and is to be in the activated state after a predetermined time (for example, 2 to 10 seconds) elapses. When the HDD is in the activated state, it becomes possible to access the HDD. Subsequently, after the elapse of a certain amount of time, the HDD is switched (402) from the activated state to the sleep state to reduce power consumption. More specifically, the HDD spins down to stop the rotation of the disk. In addition, the HDD is to be in the sleep state by supply of power to the HDD being restricted.

In the HDD as described above, it is generally known that there is a limit to the number of times the spin-up operation and the spin-down (activation and stop) operation can be executed. For example, the spin-up operation and the spin-down operation can be executed for about three hundred thousand times in a 2.5-inch HDD and for about a hundred thousand times in a 3.5-inch HDD. Thus, the spin-up operation and the spin-down operation of the HDD influence the lifespan of the HDD (that is, a period until the HDD breaks down). In other words, if the spin-up operation and the spin-down operation of the HDD are executed frequently, it will shorten the period until the breakdown of the HDD.

Accordingly, in order to avoid the breakdown of the HDD due to the spin-up operation and the spin-down operation, it is necessary to reduce the number of times the spin-up operation and the spin-down operation are executed. For example, there is a case in which control is performed to continuously maintain the HDD in the activated state once the spin-up operation of the HDD has been performed. However, this control increases the power consumption of the HDD, thereby leading to an increase in the power consumption of the apparatus incorporating the HDD. Alternatively, there is a case in which control is performed to maintain the HDD in the activated state for a predetermined time (for example, 10 min in the case of a 2.5-inch HDD or 30 min in the case of a 3.5-inch HDD) once the spin-up operation of the HDD has been performed. However, this kind of control also causes the HDD to consume extra power by maintaining the HDD in the activated state in a period in which accesses to the HDD do not occur.

<Outline of Control of HDD and SSD>

Hence, in this embodiment, in the MFP 1 that uses the HDD 6 and the SSD 207 in combination, the HDD 6 and the SSD 207 are controlled so as to reduce the power consumption of the HDD 6 while avoiding the execution of the spin-up operation and the spin-down operation of the HDD 6 as much as possible. As will be described below, the disk controller 206 controls the HDD6 so as to prioritize the use of the SSD 207 and maintain the HDD 6 in the sleep state unless the HDD 6 needs to be used.

The disk controller 206 causes, in a state in which data can be stored in the SSD 207 (that is, in a state in which the SSD 207 is activated), the HDD 6 to be in the sleep state and continuously keeps the HDD 6 in the sleep state as much as possible. In addition, the disk controller 206 determines, while the MFP 1 is activated, whether or not it is necessary to use the HDD 6 based on the data storage capacity (free space) remaining in the SSD 207. If it is determined that the HDD 6 needs to be used while the HDD 6 is in the sleep state, the disk controller 206 makes the HDD 6 switch from the sleep state to the activated state.

More specifically, the disk controller 206, having received the information indicating the remaining storage capacity (free space) from the SSD 207, determines whether or not the remaining storage capacity of the SSD 207 is equal to or less than a predetermined capacity. If it is determined that the remaining storage capacity of the SSD 207 is equal to or less than the predetermined capacity, the disk controller 206 sends the following instruction to the power supply control unit 212. That is, the disk controller 206 controls the power supply control unit 212 so as to start supply of power from the power supply unit 10 to the HDD 6. If the supply of power from the power supply unit 10 is started, the HDD 6 spins up and starts the storage operation.

For example, if the remaining storage capacity of the SSD 207 is not equal to or less than a predetermined threshold (predetermined capacity), the disk controller 206 will determine that the HDD 6 need not be used. On the other hand, if the remaining storage capacity is equal to or less than the threshold and a write access to the storage devices has occurred, the disk controller 206 will determine that the HDD 6 needs to be used. That is, in a case in which the remaining storage capacity of the SSD 207 is insufficient and there is possibility that the write-target data due to the write access cannot be stored in the SSD 207, the disk controller 206 activates the HDD 6 and causes the HDD to be in a usable state.

Such control performed by the disk controller 206 allows the HDD 6 to be continuously maintained in the sleep state unless the remaining storage capacity of the SSD 207 becomes insufficient (and unless access to the HDD 6 does not occur). Therefore, it becomes possible to reduce the power consumption of the HDD 6 while avoiding the execution of the spin-up operation and the spin-down operation (activation and stop) of the HDD 6 as much as possible. As a result, the power consumption of the MFP 1 incorporating the HDD 6 is reduced.

<Control Procedure of HDD and SSD>

Figure 5:
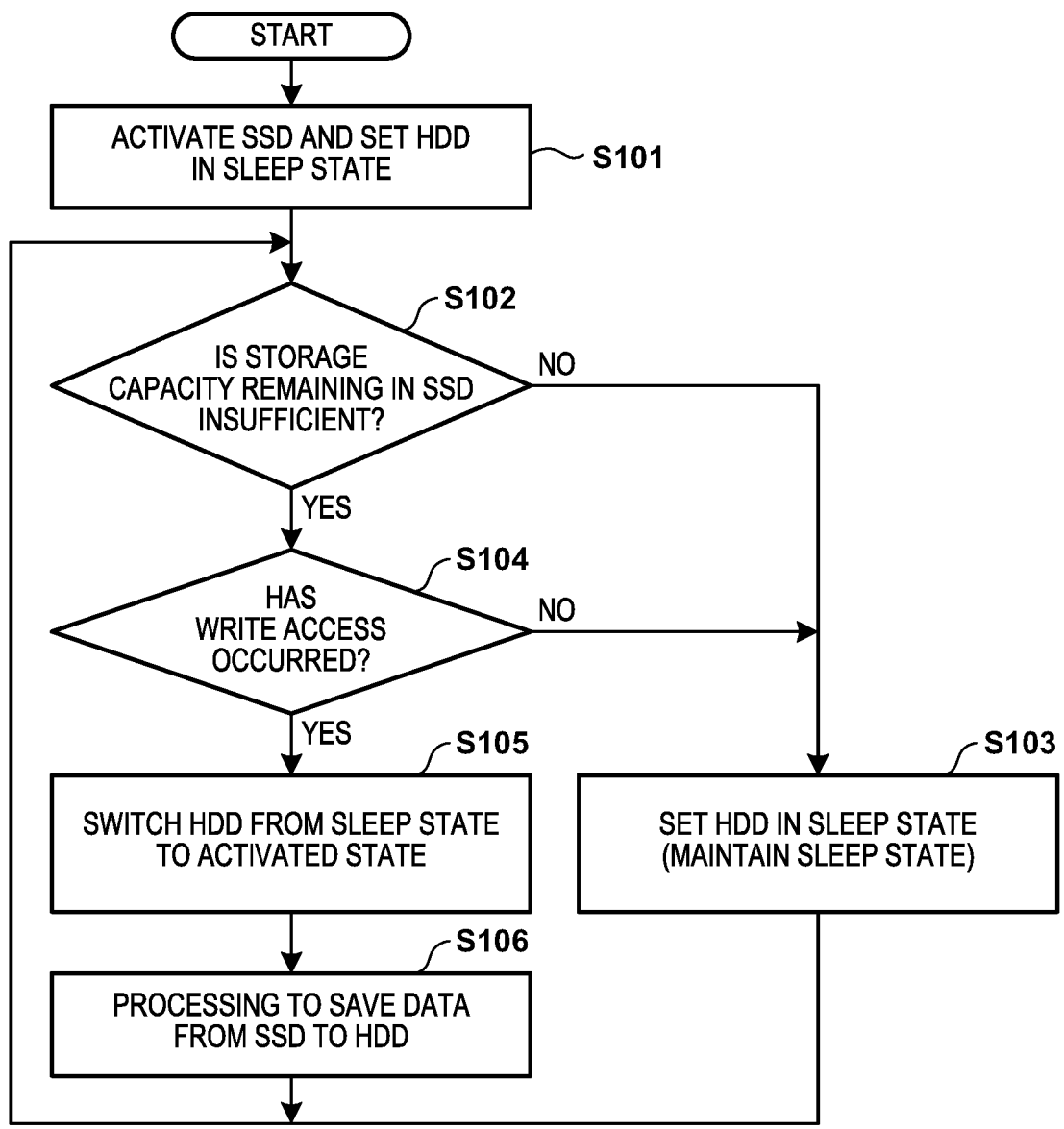
FIG. 5 is a flowchart showing an example of a control procedure of the HDD and the SSD.

FIG. 5 is a flowchart showing an example of the control procedure of the HDD 6 and the SSD 207 executed by the disk controller 206. Note that the processing of each step shown in FIG. 5 may be implemented by hardware such as FPGA, ASIC, or the like or may be implemented by software. In a case in which it is implemented by software, each processing may be implemented by processing in which the main CPU 201 or a processor (not shown) in the disk controller 206 reads out and executes a control program stored in the HDD 6 or the like.

When the MFP 1 is activated from a power-off state, in step S101, the disk controller 206 activates the SSD 207 and causes the HDD 6, on the other hand, to be in the sleep state without activating the HDD. Subsequently, in step S102, the disk controller 206 determines whether or not the remaining storage capacity is insufficient by determining whether or not the remaining storage capacity of the SSD 207 is equal to or less than a predetermined threshold. If the disk controller 206 determines that the remaining storage capacity of the SSD 207 is not equal to or less than the predetermined threshold, it advances the process to step S103. In step S103, the disk controller 206 maintains the HDD 6 in the sleep state, and returns the process to step S102. On the other hand, in step S102, if the disk controller 206 determines that the remaining storage capacity of the SSD 207 is equal to or less than the predetermined threshold, it advances the process to step S104.

In step S104, the disk controller 206 determines whether or not a write access to the storage devices (the HDD 6 and the SSD 207) has occurred. If the disk controller 206 determines that the write access has not occurred, it advances the process to step S103. In step S103, the disk controller 206 maintains the HDD 6 in the sleep state and returns the process to step S102. On the other hand, in step S104, if the disk controller 206 determines that the write access has occurred, it advances the process to step S105.

In this manner, in steps S102 and S104, the disk controller 206 determines whether or not the HDD 6 needs to be used based on the remaining storage capacity of the SSD 207. The disk controller 206 will determine that the HDD 6 needs to be used in a case in which the remaining storage amount of the SSD 207 is equal to or less than a predetermined threshold and when a write access has occurred, and will subsequently make the process advance to step S105. In step S105, the disk controller 206 makes the HDD 6 switch from the sleep state to the activated state. That is, the disk controller 206 causes the HDD 6 to be in the activated state by causing the HDD to spin up, thereby allowing data to be written in the HDD 6. In this manner, in a case in which it is determined that the free space of the SSD 207 is equal to or less than a predetermined threshold, the disk controller 206 makes the following instruction to the power supply control unit 212. That is, the disk controller 206 controls the power supply control unit 212 so as to start supply of power from the power supply unit 10 to the HDD 6. When supply of power from the power supply unit 10 is started, the HDD 6 spins up and starts the storage operation.

Subsequently, in step S106, the disk controller 206 may increase the remaining storage capacity of the SSD 207 by executing save processing of saving a predetermined amount of data from the SSD 207 to the HDD 6. As a result of this operation, the disk controller 206 may causes the SSD 207 to be in a data-writable state and store, in the SSD 207, the write-target data of the write access. Subsequently, the disk controller 206 makes the process return to step S102 to repeat the above-described processing. In this case, if the remaining storage capacity of the SSD 207 becomes not equal to or less than a predetermined threshold (NO in step S102), the disk controller 206 makes, in step S103, the HDD 6 return to the sleep state from the activated state. As a result, the power consumption of the HDD 6 is reduced.

In the same manner, in a case in which the total amount of data stored in the SSD 207 and the HDD 6 becomes less than or equal to a predetermined threshold (or in a case in which the amount of data stored alone in the SSD 207 becomes less than or equal to a predetermined threshold), the disk controller 206 can make the HDD 6 switch from the sleep state to the activated state, and move all or some of the data stored in the HDD 6 to the SSD 207. By making the data stored in the storage devices (the SSD 207 and the HDD 6) concentrate to the SSD 207 by the above-described processing, it is possible to reduce, again, the number of times the HDD 6 is returned (from the sleep state) due to CPU access.

The disk controller 206 maintains, after the activation of the MFP 1, the HDD 6 in the sleep state without switching the HDD to the activated state as much as possible by the above-described processing. As a result, it becomes possible to reduce the power consumption of the HDD 6 while avoiding execution of activating and stopping the HDD 6 as much as possible, and thus the power consumption of the MFP 1 can be reduced.

<Write Control at Time of Occurrence of Write Access>

Figure 3B:
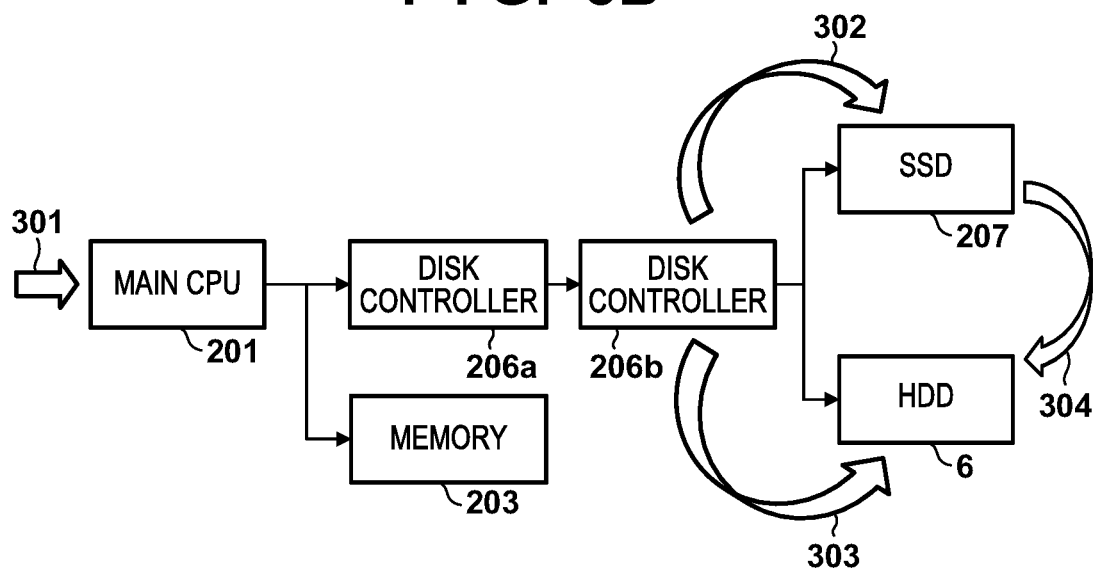
FIG. 3B is a block diagram showing an arrangement for access control to the HDD and the SSD.

An example of data write control to the storage devices (the HDD 6 and the SSD 207) executed by the disk controller 206 when a write access to the storage devices occurs will be described next with reference to FIG. 3B.

In this embodiment, in a case in which a write access to a storage device occurs (301 in FIG. 3B), the disk controller 206 selects a storage destination of write-target data from the HDD 6 and the SSD 207 so that the HDD 6 will be maintained in the sleep state as much as possible. That is, the write access is made to concentrate to the SSD 207 as much as possible. More specifically, the disk controller 206 performs control so as to select, based on the type and the size of the target data, the data storage destination from the HDD 6 and the SSD 207 and to store the data in the selected storage destination. In this case, as will be described below, the disk controller 206 will select as the data storage destination the SSD 207 with priority based on the type and the size of the target data.

For example, if the size of the write-target data is smaller than a predetermined size, the disk controller 206 will select (302) the SSD 207 as the data storage destination. Also, if the write-target data is data determined to be high-access-frequency type data, the disk controller 206 will select (302 of FIG. 3B) the SSD 207 as the data storage destination. Such high-access-frequency type data may be determined based on the type of the job to be executed in the MFP 1. The high-access-frequency type data may include data which is to be used each time a job is to be executed in the MFP 1 and the setting data (that is, data other than image data) of the MFP 1. For write-target data other than the data described above, the disk controller 206 selects (303 of FIG. 3B) the HDD 6 as the data storage destination.

By performing the write control as described above, only limited sets of data will be stored in the HDD 6 and many sets of data will be stored in the SSD 207. Hence, it becomes possible to suppress the number of times the HDD 6 will be activated from the sleep state for data storage. As a result, it becomes possible to reduce the power consumption of the HDD 6 while avoiding execution of activating and stopping the HDD 6 as much as possible.

In this embodiment, the disk controller 206 may further temporarily accumulate, in the SSD 207, data whose selected storage destination is the HDD 6 while the HDD 6 is in the sleep state. In this case, after the amount of data accumulated in the SSD 207 reaches a predetermined amount, the disk controller 206 may make the HDD 6 switch from the sleep state to the activated state and move (304 of FIG. 3B) the accumulated data in one batch from the SSD 207 to the HDD 6. This predetermined amount is preset to be, for example, 10% of the total storage capacity of the SSD 207, the 20% of the remaining storage capacity of the SSD 207, or the like. According to this kind of write control operation, it becomes possible to further suppress the number of times the HDD 6 will be activated (returned) from the sleep state.

Note that the one batch movement (304 of FIG. 3B) of data from the SSD 207 to the HDD6 can be executed as the data save processing (step S106) when the remaining storage capacity of the SSD 207 is insufficient as described above.

Second Embodiment

In the first embodiment, the disk controller 206 performs the data save processing (S106) from the SSD 207 to the HDD 6 if the storage capacity of the SSD 207 is insufficient when a write access to the storage devices has occurred. In the second embodiment, a disk controller 206 performs control to prevent the performance of an MFP 1 from degrading due to the time required for activating an HDD 6 from a sleep state when such a write access occurs. For the sake of descriptive convenience, parts different from the first embodiment will be mainly described hereinafter.

<Write Control at Time of Occurrence of Write Access>

Figure 6A:
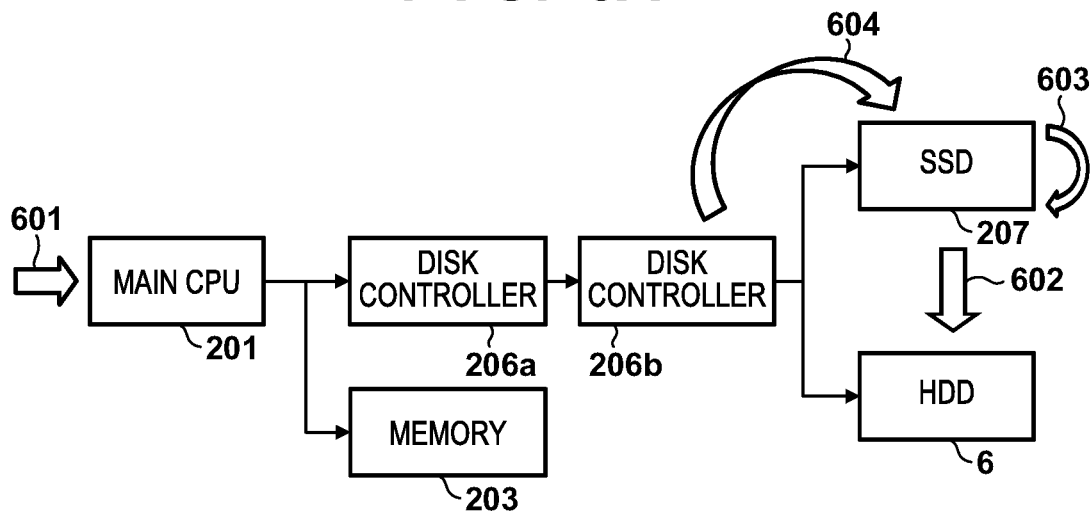
FIG. 6A is a block diagram showing an arrangement for access control to the HDD and the SSD.

First, an example of data write control performed when the remaining storage capacity of an SSD 207 is insufficient at the time of the occurrence of a write access to the storage devices will be described next with reference to FIG. 6A.

When a write access to the storage devices has occurred (601 of FIG. 6A), the disk controller 206 activates the HDD 6 from the sleep state in the above-described manner if the storage capacity of the SSD 207 is insufficient. Subsequently, the disk controller 206 copies (602 of FIG. 6A) some sets of data stored in the SSD 207 to the HDD 6 and deletes (603 of FIG. 6A) the copied sets of data from the SSD 207. In this manner, the disk controller 206 performs the processing (step S106) to save data from the SSD 207 to the HDD 6. Since this solves the state of the storage capacity insufficiency of the SSD 207, the disk controller 206 stores (604 of FIG. 6A), in the SSD 207, the write-target data of the write access.

In this kind of save processing, the execution of the operation to store the write-target data in the SSD 207 has to wait for a period of time until the HDD 6 is changed from the sleep state to the activated state. This means that the access speed to the storage devices (the HDD 6 and the SSD 207) will decrease substantially, and thus lead to performance degradation of the MFP 1.

Figure 6B:
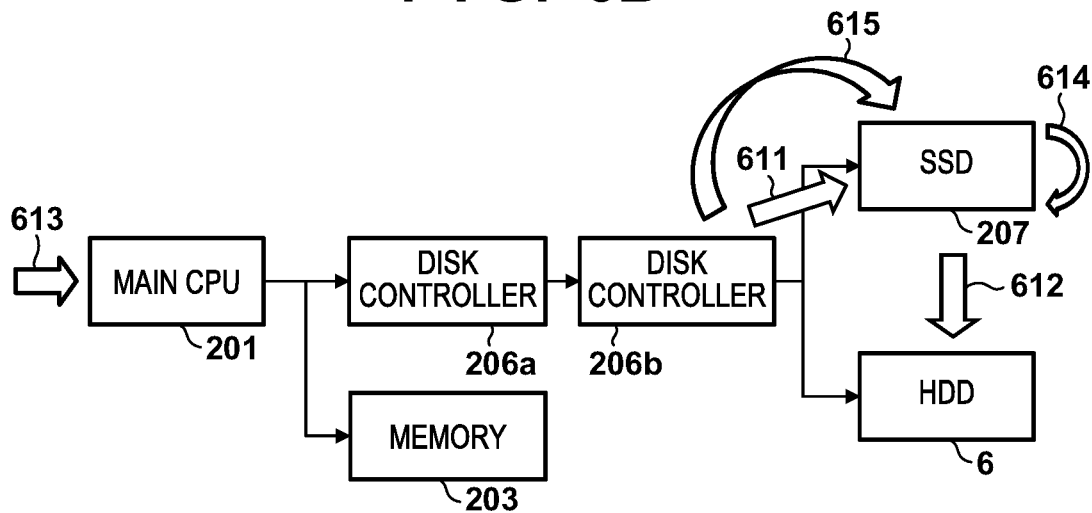
FIG. 6B is a block diagram showing an arrangement for access control to the HDD and the SSD.

Accordingly, in this embodiment, the disk controller 206 will perform control as shown in FIG. 6B to prevent the performance of the MFP 1 from degrading due to the time required to activate the HDD 6 from the sleep state when a write access occurs. More specifically, while the HDD 6 is in the sleep state (or while a job is not executed in the MFP 1), the disk controller 206 decides (611 of FIG. 6B) data candidates to be saved to the HDD 6 among the data stored in the SSD 207. The disk controller 206 makes the HDD 6 switch from the sleep state to the activated state when the remaining storage capacity of the SSD 207 becomes insufficient (becomes equal to or less than a predetermined threshold). Furthermore, the disk controller 206 copies (612 of FIG. 6B) the decided save candidate data from the SSD 207 to the HDD 6.

Subsequently, when a write access to the storage devices occurs (613 of FIG. 6B), the disk controller 206 deletes (614 of FIG. 6B), from the SSD 207, the save candidate data which is stored in the SSD 207 and has been copied to the HDD 6. After the save candidate data has been deleted, the disk controller 206 stores (615 of FIG. 6B), in the SSD 207, the write-target data of the write access.

In the above-described processing, save candidate data is copied from the SSD 207 to the HDD 6 when the remaining storage capacity of the SSD 207 becomes insufficient. In addition, when a write access to the storage devices occurs, storage capacity insufficiency of the SSD 207 is solved by only deleting the data in the SSD 207. Hence, when a write access occurs, there is no need to perform the data save processing as that shown in FIG. 6A, and the execution of the operation to store the write-target data in the SSD 207 does not have to wait during the period of time until the HDD 6 changes from the sleep state to the activated state. Therefore, it is possible to prevent the performance of the MFP 1 from degrading due to the time required to activate the HDD 6 from the sleep state when a write access to the storage devices occurs.

The above-described decision of save candidate data can be performed, as will be described later, in accordance with a priority which is set for each set of data stored in the SSD 207. The priority of the data is set based on at least one of, for example, the data type, the data size, the data access frequency, and the elapsed time since the last access to the data has occurred.

<Control Procedure of HDD and SSD>

Figure 7:
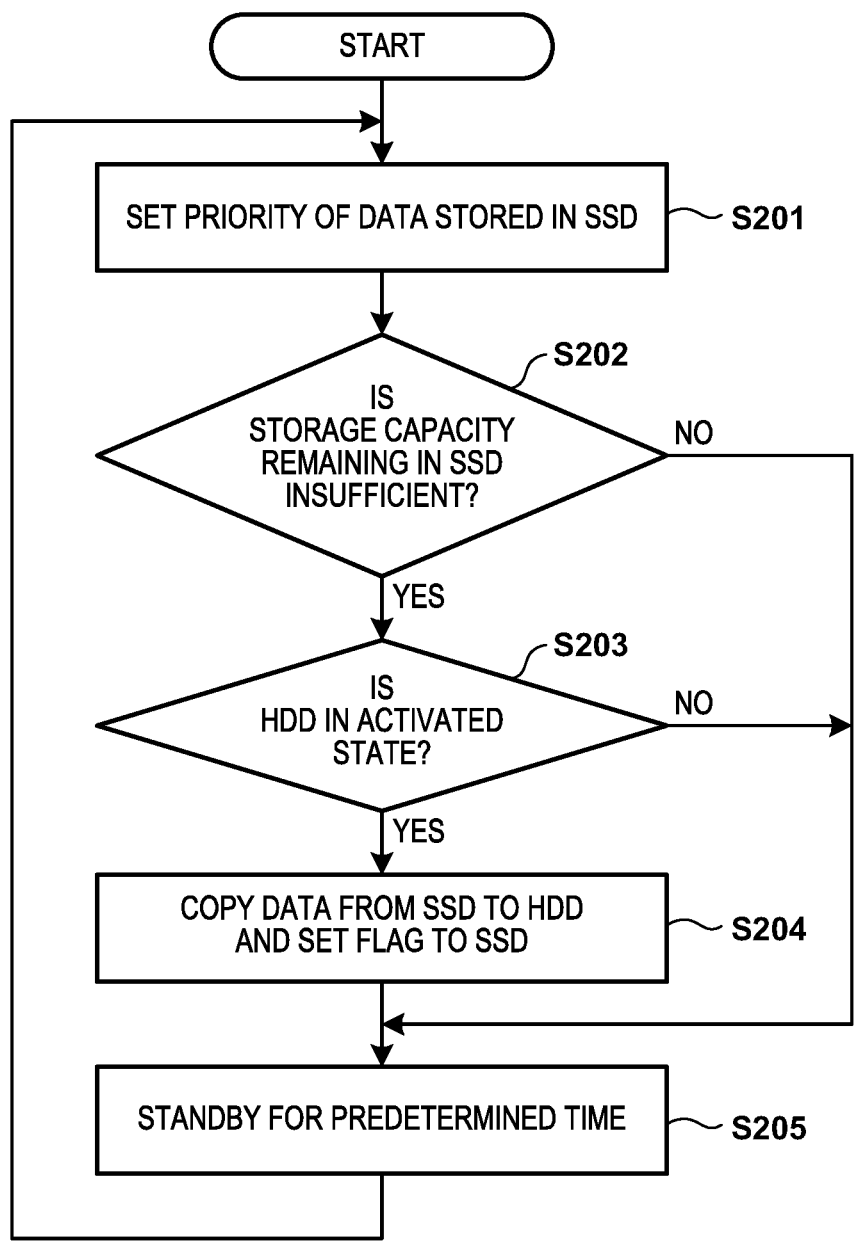
FIG. 7 is a flowchart showing an example of a control procedure of the HDD and the SSD.

FIG. 7 is a flowchart showing an example of the control procedure of the HDD 6 and the SSD 207 that is executed by the disk controller 206. Note that the processing of each step shown in FIG. 7 may be implemented by hardware such as FPGA, ASIC, or the like or may be implemented by software. In a case in which the processes are to be implemented by software, each processing may be implemented by processing in which a main CPU 201 or a processor (not shown) in the disk controller 206 reads out and executes a control program stored in the HDD 6 or the like.

In step S201, while the HDD 6 is in the sleep state (or while a job is not executed in the MFP 1), the disk controller 206 sets the priority for deciding the save candidate data, to each set of data stored in the SSD 207. The priority setting may be performed based on at least one of the data type, the data size, the data access frequency, and the elapsed time since the last access to the data.

In this embodiment, as shown in FIG. 8, a score is obtained for each set of data stored in the SSD 207 based on the data type, the data access frequency, and the elapsed time since the last (most recent) access to the data has occurred. In FIG. 8, a score, whose minimum value is 0 and maximum value is 100, is set with respect to each of the data type, the data access frequency, and the elapsed time since the most recent access. For example, with respect to the data type, a score has been set for each type. With respect to the data size, (100—size [MB]) is set as the score. With respect to the access frequency, (the number of times of accesses in the last 24 hours×5) is set as the score. Also, with respect to the elapsed time since the most recent access, (100—the elapsed time) is set as the score. The disk controller 206 obtains the priority of each set of data by obtaining the total sum of the scores of the respective items shown in FIG. 8 for each set of data stored in the SSD 207.

Next, in step S202, the disk controller 206 determines whether or not the remaining storage capacity of the SSD 207 has become insufficient (whether or not the remaining storage capacity has become equal to or less than a threshold). This threshold is, for example, set to be 40% of the total storage capacity of the SSD 207. The disk controller 206 will cause the process to advance to step S205 if the storage capacity is not insufficient, and returns the process to step S201 after standing by for a predetermined time. On the other hand, if the storage capacity is insufficient, the disk controller 206 will cause the process to advance to step S203.

In step S203, the disk controller 206 determines whether or not the HDD 6 is in the activated state. If the HDD 6 is not in the activated state, the disk controller 206 activates the HDD 6, makes the process advance to step S205, and makes the process return to step S201 after standing by for a predetermined time. On the other hand, if the HDD 6 is in the activated state, the disk controller will make the process advance to step S204. In step S204, the disk controller 206 decides, based on the priority of the data set in step S201, the data (data B in FIG. 8) with the lowest priority as the data candidate (save candidate data) to be saved in the HDD 6, and copies the data to the HDD 6. In addition, the disk controller 206 sets, to the save candidate data held intact in the SSD 207, a flag indicating that the data has been already copied to the HDD 6. Subsequently, the disk controller 206 makes the process advance to step S205 and makes the process return to step S201 after standing by for a predetermined time. As a result, when a write access to the storage devices occurs, the disk controller 206 deletes, from the SSD 207, the data that was set with the flag in step S204 among the sets of data stored in the SSD 207. Hence, the disk controller 206 can ensure the storage capacity of the SSD 207 and store the data in the SSD 207.

As described above, in this embodiment, in a case where the remaining storage capacity of the SSD 207 is insufficient, the disk controller 206 copies, in advance, some of the data stored in the SSD 207 to the HDD 6. As a result, when a write access has occurred, the storage capacity of the SSD 207 can be ensured by only deleting the data which is stored in the SSD 207 and has been already copied to the HDD 6, and thus it becomes unnecessary to execute the data save processing to the HDD 6. Therefore, it is possible to prevent the performance of the MFP 1 from degrading due to the time required for activating the HDD 6 from the sleep state when a write access to the storage devices occurs.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the embodiments described above, in an information processing apparatus that uses an HDD and an SSD in combination, it becomes possible to reduce the power consumption of the HDD while avoiding the execution of the spin-up operation and the spin-down operation of the HD as much as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
a non-volatile first storage that can shift to a first power state in which at least write processing can be executed and to a second power state in which power consumption is less than in the first power state and write processing cannot be executed;
a non-volatile second storage that has a higher access speed than the first storage; and a controller configured to:
confirm a remaining storage capacity in which data can be stored in the second storage, wherein
in a case where the remaining storage capacity is not less than or equal to a threshold, not cause the first storage to shift from the second power state to the first power state; and
in a case where the remaining storage capacity is less than or equal to the threshold, not cause the first storage to shift from the second power state to the first power state until receiving a data write request, and in accordance with reception of the data write request, cause the first storage to shift from the second power state to the first power state and cause a part of data stored in the second storage to be stored in the first storage that has shifted to the first power state.

2. The information processing apparatus according to claim 1,
wherein
in accordance with reception of the data write request, the controller selects a storage destination of data from the first storage unit and the second storage based on a type and a size of the data, and
the controller causes target data of the write request to be stored in the selected storage.

3. The information processing apparatus according to claim 2, wherein the controller selects, as the storage destination of the target data, the second storage unit with priority based on the type and the size of the target data.

4. The information processing apparatus according to claim 2, wherein the controller selects the second storage unit as the storage destination of the target data in a case where the size of the target data is smaller than a predetermined size.

5. The information processing apparatus according to claim 2, wherein the controller selects the second storage unit as the storage destination of the target data in a case where the target data is data set as high-access frequency type data.

6. The information processing apparatus according to claim 5, wherein the high-access frequency type data is set based on a type of a job to be executed in the information processing apparatus.

7. The information processing apparatus according to claim 5, wherein the high-access frequency type data includes data to be used for each execution of a job in the information processing apparatus and setting data of the information processing apparatus.

8. The information processing apparatus according to claim 2, wherein the controller temporarily accumulates data, for which the first storage has been selected as the storage destination, in the second storage while the first storage is in the second power state, causes the first storage to shift from the second power state to the first power state when an amount of the accumulated data reaches a predetermined amount, and moves the accumulated data from the second storage to the first storage at once.

9. The information processing apparatus according to claim 1, wherein the first storage is an HDD and the second storage is an SSD.

10. The information processing apparatus according to claim 1, wherein, after the information processing apparatus is activated from a power-off state, the second storage is continuously maintained in the first power state.

11. An information processing apparatus comprising:
a non-volatile first storage that can shift to a first power state in which at least write processing can be executed and to a second power state in which power consumption is less than in the first power state and write processing cannot be executed;
a non-volatile second storage that has a higher access speed than the first storage; and
a controller configured to:
in a case where the remaining storage capacity is not less than or equal to a threshold, not cause the first storage to shift from the second power state to the first power state; and
in a case where the remaining storage capacity is less than or equal to the threshold, cause the first storage to shift from the second power state to the first power state and cause a part of data stored in the second storage to be stored in the first storage that has shifted to the first power state,
wherein the controller decides, among data stored in the second storage, a data candidate to save to the first storage, while the first storage is in the second power state,
the controller causes the first storage to shift from the second power state to the first power state when the remaining storage capacity becomes less than or equal to a predetermined threshold, copies the decided save candidate data from the second storage to the first storage, and sets a flag to the save candidate data stored in the second storage when performing the copying of the save candidate data, and
the controller deletes the data to which the flag is set from the second storage in accordance with reception of a data write request.

12. The information processing apparatus according to claim 11, wherein the controller decides the save candidate data in accordance with a priority that has been set, on the data stored in the second storage, based on at least one of a data type, a data size, a data access frequency, and an elapsed time since the last access to the data occurred.

13. A control method of an information processing apparatus that has a non-volatile first storage that can shift to a first power state in which at least write processing can be executed and to a second power state in which power consumption is less than in the first power state and write processing cannot be executed, and a non-volatile second storage that has a higher access speed than the first storage, the method comprising:
confirming a remaining storage capacity in which data can be stored in the second storage;
in a case where the remaining storage capacity is not less than or equal to a threshold, not cause the first storage to shift from the second power state to the first power state; and
in a case where the remaining storage capacity is less than or equal to the threshold, not cause the first storage to shift from the second power state to the first power state until receiving a data write request, and in accordance with reception of the data write request, cause the first storage to shift from the second power state to the first power state and cause a part of data stored in the second storage to be stored in the first storage that has shifted to the first power state.

* * * * *